April 9, 1935.  F. BETTERIDGE ET AL  1,997,509
COOKING UTENSIL
Filed Sept. 1, 1932
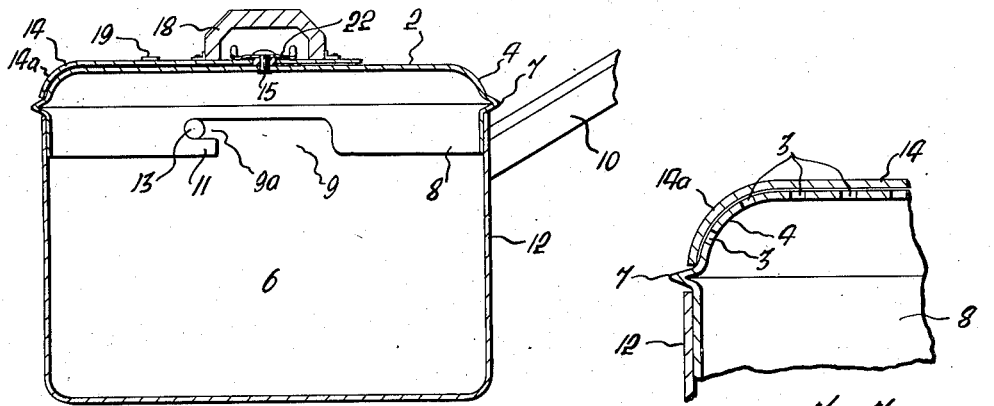
Fig. 1.
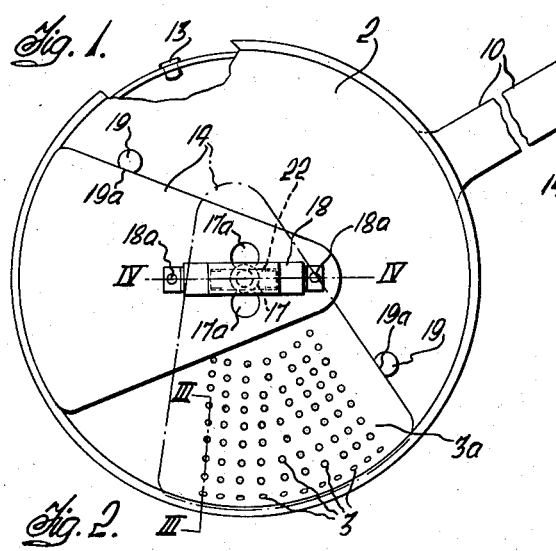
Fig. 2.
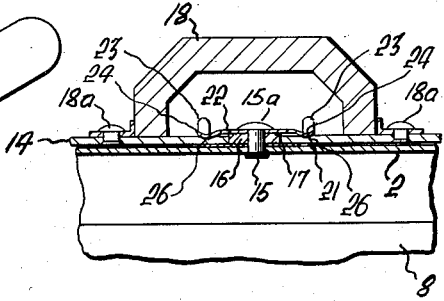
Fig. 3.
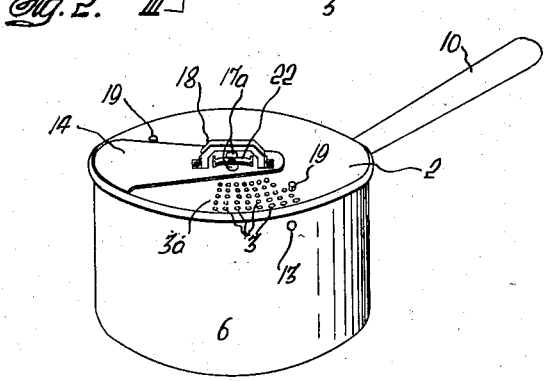
Fig. 4.
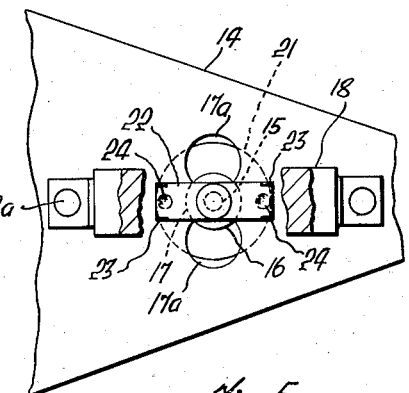
Fig. 5.
Fig. 6.
F. Betteridge
H. Betteridge
INVENTORS
By: Marks & Clerk
ATTYS.

Patented Apr. 9, 1935

1,997,509

UNITED STATES PATENT OFFICE 1,997,509

COOKING UTENSIL

Frances Betteridge and Harold Betteridge,
Oakleigh, Victoria, Australia

Application September 1, 1932, Serial No. 631,414
In Australia October 1, 1931

5 Claims. (Cl. 53—8)

This invention relates to saucepans and like vessels, more particularly to combined lid and strainer devices of the known type wherein the lid is provided near its periphery and at one side with a sector or fan like group of perforations adapted to be covered and uncovered at will by a plate or like member movably mounted to the lid, whereby the liquid contents of the vessel may be readily and conveniently poured off or strained from the solids therein without moving the lid.

It has hitherto been proposed to pivot such a cover plate to the central portion of a lid and to provide the cover plate with a handle for turning it into perforation covering and exposing positions. According to one such proposal the lid may be locked in position on the vessel by pin and slot means operable by partial rotation of the lid. According to another proposal the lid is locked in position by the cover plate which is disposed beneath the lid and furnished with lips projecting through slots in a depending flange of the lid and adapted to extend beneath an inturned rim at the upper edge of the vessel, whereby the lid is first locked in position by the lips during initial turning of the cover plate, continued turning of which exposes the lid perforations.

The present invention provides a device of the kind indicated in which the lid is locked to the vessel by pin and slot or like means operable by partial rotation of the lid and in which such partial rotation of the lid, either to lock it or to unlock it, is effected by the cover plate co-operating with stops on the lid which limit the movement of the cover plate in relation to the lid.

The invention consists primarily in a combination and arrangement of parts comprising a lid having a perforated zone, means for locking the lid to a vessel by partial rotation of the lid thereon, a cover plate pivoted to the lid and provided with a handle, and stops on the lid located one at each side of the perforated zone, said stops limiting the turning movements of the cover plate in relation to the lid and enabling the latter and the cover plate to be turned in unison by said handle, the parts being so arranged that the lid is locked to the vessel by a continuation of the turning movement of the handle necessary to bring the cover plate into an open position, and is unlocked by a continuation of the turning movement of the handle necessary to bring the cover plate into a closed position.

The invention also involves simple and effective means for pivotally mounting the cover plate upon the lid whereby the plate may be easily removed for cleaning purposes and as readily replaced.

The above and other objects and features of the invention and the advantages arising therefrom will, however, be more readily apparent from the following description aided by the accompanying drawing, in which Figure 1 is a vertical section of a saucepan with combined lid and strainer according to the invention.

Figure 2 is a plan of Figure 1 showing the cover plate in a position to permit pouring off or straining of the liquid contents.

Figure 3 is an enlarged section taken on line III—III of Figure 2.

Figure 4 is an enlarged section taken on line IV—IV of Figure 2 showing means for detachably and pivotally retaining the cover plate to the lid.

Figure 5 is a plan of Figure 4.

Figure 6 is a perspective view with the cover plate in a position to permit pouring off or straining of the liquid contents.

The invention includes a lid 2 provided with a series or group of perforations 3 which preferably extends inwardly from the outer peripheral portion of the lid towards the centre thereof so as to provide a perforated zone or portion 3a of somewhat segmental shape. The lid has, at its outer periphery, a rounded or downturned edge portion 4 which is preferably of considerable depth and through which one or more circumferential rows of the perforations 3 are formed in order to ensure efficient pouring off of the liquid contents of the saucepan 6. The downturned edge portion may merge into an outwardly expressed circumferential bead 7 which rests upon the upper edge of the saucepan when the lid is operatively applied.

A circumferential lip 8 depending from the bead 7 may be provided with diametrically opposite circumferentially extending slots 9 of "bayonet" formation, each slot being open at the bottom and having at its top a comparatively narrow circumferentially extending portion 9a, the lower edge of which is defined by a tongue-like portion 11 at the lower edge of the lid 8. The upstanding wall 12 of the saucepan is provided with diametrically opposite inward projections which may be constituted by pins or rivets 13 or, if desired, by localized inward expressions of the wall 12. The slots 9, 9a and projections 13 enable the lid to be detachably but securely applied to the saucepan as will be readily understood.

The slots 9, 9a are so located in relation to the group of perforations 3 that when the lid is operatively applied to the saucepan the group of perforations extends at substantially right angles to the length of the vessel handle 10 when viewed in plan and preferably at the left hand side thereof as in Figures 2 and 6.

It will be evident from the foregoing that the liquid may be readily and conveniently poured off through the perforations 3 without fouling the handle 10.

The cover plate 14 may advantageously be of substantially segmental or V shape and of thin sheet metal, the outer edge portion 14a being curved or downturned complementary to the rounded shoulder or circumferential portion 4 of the lid so that all of the perforations 3 will be closed when the cover plate is in its normal position, as indicated by broken lines in Figure 2.

Means for retaining the cover plate to the lid so that it may, when desired, be turned to uncover the perforations 3 may include a pivot pin or rivet 15 upstanding from the centre of the lid. The upwardly projecting portion of the pin may be encircled by a collar or washer 16 which is a close fit within a hole 17 formed in the cover plate, which may be provided with a suitable handle 18 to facilitate the turning thereof about the washer 16. This handle may be secured to the cover plate by rivets 18a or the like.

Stops, such as pins 19 or expressed portions of the lid, upstand from the lid at opposite sides of the group of perforations 3. These stops limit the turning movements of the cover plate and also serve to connect the cover plate to the lid so that the latter may be partially rotated upon the vessel by the handle 18 in order to lock the lid to the vessel by the pin and slot means 9, 13. The parts are so arranged that a single turning movement of the handle 18 in one direction causes the cover plate to be first moved into a perforation exposing position in which it engages one of the stops 19 and the lid, as well as the cover plate, then turned in relation to the vessel until the pins 13 are properly home in their slots 9 as in Figure 1.

Unlocking of the lid from the vessel can only be effected by reversing the direction of rotation of the handle 18 and continuing such turning after the cover plate has been arrested in its perforation closing position by the other stop 19. It follows from this construction and arrangement that straining through the exposed perforations can only take place with the lid in a locked position. The possibility of the user being scalded or accidents occurring due to the lid falling off during straining operations is thus avoided. Of course, the cover plate can be freely moved at all times between the two stops 19 without unlocking the lid from the vessel.

To prevent the stops 19 or the side edges of the plate from being indented by repeated engagement of the plate with the stops, the latter may have flat contact faces 19a to provide a relatively wide area of contact, instead of point contact, with the side edges of the plate. Or the stops may be of circular cross section and the side edges of the plate provided with complementary curved recesses.

A distance piece 21 may be interposed between the top of the lid and the bottom of the cover plate in order to prevent friction between said parts and scratching or scoring of the upper surface of the lid by the turning movements of the cover plate.

To provide for quick and easy detachment of the cover plate to permit of cleaning same and the lid, a locking member 22 such as a turn piece or strip may be rotatable about the pivot pin 15 and rest diametrically upon washer 16 and project beyond same at each end. The head 15a of the pin prevents upward movement of the locking strip 22, which may have upturned portions or finger pieces 23 at its ends whereby it may be turned about the pin 15 to thereby bring the projecting end portions of the strip into alignment with sideward extensions 17a of the hole 17 in the cover plate. When the locking strip 22 is in its normal position, as in Figure 4, it retains the cover plate to the lid but by turning the strip 22 so that it is aligned with the holes 17, 17a the cover plate is freed from the locking strip and may be easily lifted off the lid.

In order to prevent inadvertent turning of the locking strip 22 from its normal or locking position during the turning of the cover plate 14, the locking strip may be of somewhat spring bowed form, the ends thereof having detents 24 which bear downwardly into depressions 26 formed in the upper surface of the cover plate as in Figures 4 and 5.

Whilst the invention is shown in the accompanying drawings applied to a saucepan, it will be evident that it may be advantageously applied to a variety of vessels such as billy cans and other cooking and like utensils.

Having now described our invention what we claim as new and desire to secure by Letters Patent is—

1. An improved combined lid and strainer device for saucepans and like vessels, comprising in combination a lid having a perforated zone, means for locking the lid to a vessel by partial rotation of the lid thereon, an imperforate cover plate pivoted to the lid and provided with a handle, and stops on the lid located one at each side of the perforated zone, said stops limiting the turning movements of the cover plate in relation to the lid and enabling the latter and the cover plate to be turned in unison by said handle, the parts being so arranged that the lid is locked to the vessel by a continuation of the turning movement of the handle necessary to bring the cover plate into its fully open position, and is unlocked by a continuation of the turning movement of the handle necessary to bring the cover plate into its fully closed position.

2. In a device of the character described, in combination, a lid having a perforated zone, a cover plate for removably covering the zone and means for detachably pivoting the plate to the lid including a pivot pin projecting upwardly from the lid and passing through a hole in the plate, and a locking strip free to turn about the pivot pin above the cover plate which is provided with sideward extensions of said hole of a size sufficient to enable the locking piece to pass therethrough.

3. In a device of the character described, in combination, a lid having a perforated zone, a cover plate for removably covering the zone and means for detachably pivoting the plate to the lid including a pivot pin projecting upwardly from the lid and passing through a hole in the plate, and a locking strip free to turn about the pivot pin above the cover plate which is provided with sideward extensions of said hole of a size sufficient to enable the locking piece to pass therethrough, said strip being of a springy nature and is adapted to bear downwardly upon the upper surface of the cover plate.

4. In a device of the character described, in combination, a lid having a perforated zone, a cover plate for removably covering the zone and means for detachably pivoting the plate to the lid including a pivot pin projecting upwardly from the lid and passing through a hole in the plate, and a locking strip free to turn about the pivot pin above the cover plate which is provided with sideward extensions of said hole of a size sufficient to enable the locking piece to pass therethrough, said strip being provided at its ends with detents adapted to enter depressions formed in said cover plate when the locking strip is in its normal position.

5. An improved combined lid and strainer device for saucepans and like vessels, comprising in combination, a lid having a perforated zone, means for locking the lid to a vessel by partial rotation of the lid thereon, a cover plate pivoted to the lid and provided with a handle, and stops on the lid located one at each side of the perforated zone, one of the stops being disposed adjacent one side of the perforated zone and the other stop being disposed comparatively remote from the other side of the perforated zone, said stops limiting the turning movements of the cover plate in relation to the lid and forming a mechanical connection between the cover plate and the lid so that the lid may be turned in relation to the vessel by said handle, whereby the lid can be locked to the vessel only by a continuation of the turning movement of the handle necessary to bring the cover plate into an open position, and can be unlocked only by a continuation of the turning movement of the handle necessary to bring the cover plate into a closed position.

FRANCES BETTERIDGE.
HAROLD BETTERIDGE.